United States Patent [19]

Hübner et al.

[11] 3,711,564

[45] Jan. 16, 1973

[54] NOVEL SULFONYLAMINOPYRIMIDINES AND COMPOSITIONS CONTAINING THEM

[75] Inventors: Manfred Hübner, Ludwigshafen (Rhine); Ruth Heerdt, Mannheim-Feudenheim; Felix Helmut Schmidt, Mannheim-Neuostheim; Kurt Stach, Mannheim-Waldhof; Walter Aumüller, Kelkheim-Munster, all of Germany

[73] Assignee: Boehringer Mannheim GmbH, Mannheim, Germany

[22] Filed: Oct. 13, 1969

[21] Appl. No.: 866,023

[30] Foreign Application Priority Data

Oct. 17, 1968 Germany..................P 18 03 582.0

[52] U.S. Cl............................260/256.5 R, 424/251
[51] Int. Cl. ..........................................C07d 51/42
[58] Field of Search................................260/256.5 R

[56] References Cited

FOREIGN PATENTS OR APPLICATIONS 1,083,250   9/1967   Great Britain

*Primary Examiner*—Alex Mazel
*Assistant Examiner*—R. V. Rush
*Attorney*—Burgess, Dinklage & Sprung

[57] ABSTRACT

Novel sulfonylaminopyrimidines, particularly 4-[β-fluorenyl-(9)-acylamido-alkylene]-N-[pyrimidinyl-(2)]-benzene-sulfonamide compounds and the corresponding indan-5-sulfonamide compounds, exhibit outstanding antidiabetic activity.

10 Claims, No Drawings

NOVEL SULFONYLAMINOPYRIMIDINES AND COMPOSITIONS CONTAINING THEM

The present invention relates to novel sulfonylaminopyrimidines and to compositions, specifically antidiabetic compositions, containing them.

It is known from Belgian Patent Specification No. 609,270, that certain substituted 2-benzene-sulfonylaminopyrimidines have blood sugar reducing action.

The compounds of this invention are of the general formula:

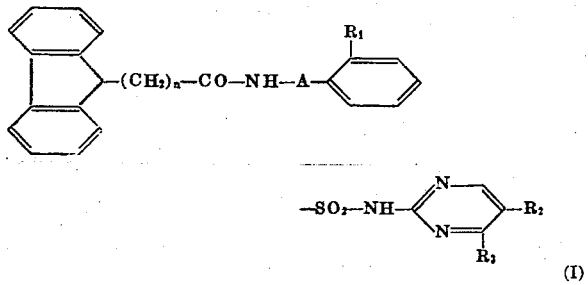

(I)

wherein A is straight or branched chain lower alkylene of from one to three carbon atoms; $R_1$ is hydrogen or, together with A, represents trimethylene; $R_2$ is alkyl, cycloalkyl, cycloalkyl-alkyl, aryl, aralkyl, alkoxy, cycloalkoxy, alkoxyalkyl, alkoxy-alkoxy or alkylmercapto, optionally substituted by halogen, hydroxyl or alkyl, $R_3$ is hydrogen or lower alkyl; and $R_2$ and $R_3$ taken together represent a chain of 3–5 methylene radicals to form, together with the carbon atoms to which they are attached, a hydrocarbyl ring structure and $n$ is 0, 1 or 2; and physiologically compatible salts thereof. Preferred are those compounds in which A contains at least two carbon atoms and wherein the acylamido function is linked to the beta carbon atom of the alkylene bridge designated as A, above; i.e., where two carbon atoms separate the acylamino function from the benzene ring. In the case of the indanyl compounds resulting when A and $R_1$ taken together represent a trimethylene bridge, the acylamido function is preferably attached to the two-position carbon of the indanyl structure so that again two carbon atoms separate said function from the benzene moiety of the indanyl structure.

The compounds of this invention have particularly strong blood sugar reducing activity.

The sulfonylaminopyrimidines of the invention can be prepared, by conventional techniques, for example, by one of the following methods:

a. Reaction of compounds of the general formula:

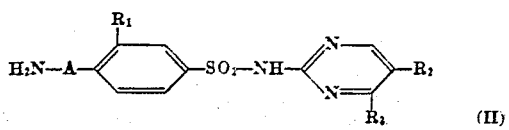

(II)

wherein A, $R_1$, $R_2$ and $R_3$ have the above-indicated meanings, with reactive derivatives of acids of the general formula:

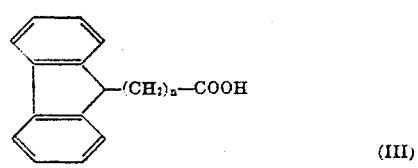

(III)

wherein $n$ is defined as above; or b. reaction of compounds of the general formula:

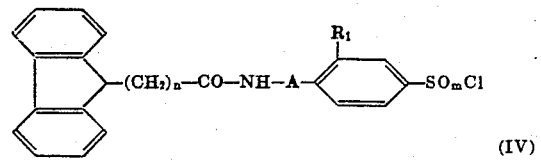

(IV)

wherein $n$, A and $R_1$ have the above-indicated meanings and $m$ is 0, 1 or 2; with 2-amino-pyrimidines of the general formula:

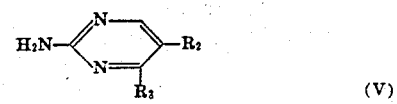

(V)

wherein $R_2$ and $R_3$ have the above meanings, whereafter, if necessary, the product obtained is oxidized to the corresponding sulfonamide; or c. reaction of benzene-sulfonyl-guanidines of the general formula:

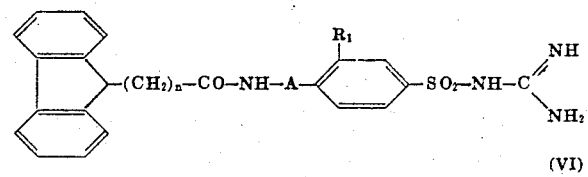

(VI)

wherein $n$, A and $R_1$ have the above-indicated meanings, with compounds of the general formulas:

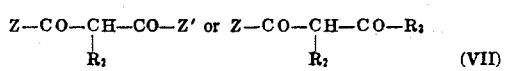

(VII)

wherein $R_2$ and $R_3$ have the above meanings and Z and Z', which may be the same or different, are hydrogen atoms or alkoxy radicals; or with functional derivatives thereof, whereafter the pyrimidines obtained which are possibly hydroxylated in the 4- and/or 6-position are converted into the desired pyrimidines by first converting them into the halogen compounds, followed by reductive dehalogenation; or d. reaction of sulfonamides of the general formula:

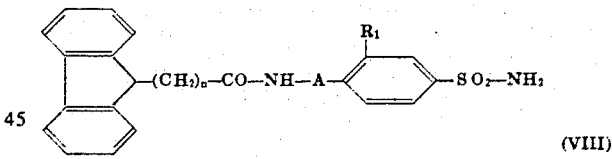

(VIII)

wherein $n$, A and $R_1$ have the above meanings, with pyrimidine derivatives of the general formula:

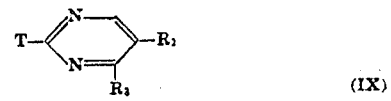

(IX)

wherein $R_2$ and $R_3$ have the same meanings as above and T is a reactive ester group or a low molecular trialkyl-ammonium group;

or, in the case of the preparation of compounds according to formula (I), above, in which $n$ is 1 or 2, e. hydrogenation of fluorenylidene compounds of the general formula:

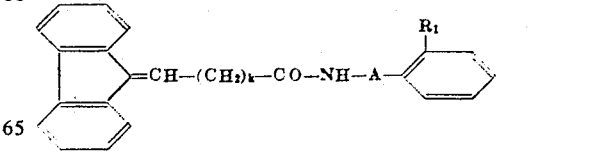

(X)

wherein A, $R_1$, $R_2$ and $R_3$ have the above meanings and $k$ is 0 or 1;

The products obtained by any of the above processes may be converted into their physiologically compatible salts, which are also encompassed by this invention, by any of the well-known standard methods.

The acylation of the compounds (II) is carried out in the usual manner by reaction with the appropriate acids (III) or with reactive derivatives thereof, such as acid halides, preferably in the presence of an acid acceptor.

The reaction of compounds (IV) and (V) is expediently carried out in an inert solvent in the presence of a base, preferably pyridine or trimethylamine. However, it is also possible to work with a molar excess of the amino-pyrimidine in order to remove the hydrogen chloride formed by the reaction. The subsequent oxidation of the sulfenamides ($m = 0$) or of the sulfinamides ($m = 1$) is carried out in the usual manner, for example, by treatment with hydrogen peroxide, potassium permanganate or nitric acid.

The condensation of the acylaminoalkyl-benzenesulfonyl-guanidines (VI) with the β-dicarbonyl compounds (VII) can be carried out, for example, by means of an alkali metal alcoholate in alcohol. The β-dicarbonyl compounds can be used either in the free form or in the form of functional derivatives thereof, for example, acetals; however, they can also be prepared by a Vilsmeier "one pot" process from aldehyde acetals or ketals or the corresponding enamines, an inorganic acid chloride and a dialkyl formamide. If, instead of the dicarbonyl compounds, there are used correspondingly substituted malonic acid diesters, malonic ester aldehydes, β-keto esters or the functional derivatives thereof, then subsequently the hydroxyl groups present in the 4-and/or 6-position of the pyrimidine ring must be replaced by chlorine with the help of an inorganic acid chloride, which can then be easily reductively replaced by hydrogen, for example with zinc dust.

The acylaminoalkyl-benzene-sulfonyl-guanidines (VI) used as starting materials can be obtained, for example, by melting together the appropriate acylaminoalkyl-benzene-sulfonamides with guanidine carbonate.

The condensation of the acylaminoalkyl-benzenesulfonamides (VIII) with the compounds (IX) is preferably carried out in the presence of a base, for example potassium carbonate.

As starting materials of general formula (IX), the 2-halopyrimidines are especially preferred; they can be obtained, for example, by the reaction of 2-hydroxypyrimidines with excess phosphorus oxychloride. Instead of the 2-halopyrimidines, the corresponding trialkyl-ammonium-pyrimidines can also be reacted with the sulfonamides to give the acylaminoalkyl-benzenesulfonylaminopyrimidines, a trialkylamine thereby also being formed as a by-product.

The hydrogenation of the fluorenylidene compounds of general formula (X) can be carried out with the use of the conventional catalysts, for example, palladium on activated charcoal, in inert solvents.

The starting materials of general formula (X) can be prepared, for example, from the corresponding fluorenylidene-(9)-alkyl-carboxylic acids and compounds of the general formula (II), using the process described above under (a).

As physiologically compatible salts, the alkali metal, alkaline earth metal and ammonium salts are particularly preferred; they can be prepared in the usual way, for example, by reaction with a solution of sodium hydroxide or of another alkali metal or alkaline earth metal hydroxide or with an aqueous solution of ammonia or with the corresponding carbonates.

The new compounds (I) according to the present invention and the salts thereof can be administered enterally and parenterally in liquid or solid form by admixing them with appropriate solid or liquid pharmaceutical carriers or diluents. As an injection medium, it is preferred to use water which contains the additives usual for injection solutions, such as stabilizing agents, solubilizing agents and buffers. Additives of this type include, for example, tartrate and borate buffers, ethanol, complex-forming agents, such as ethylenediamine-tetraacetic acid and the non-toxic salts thereof, high molecular weight polymers, such as liquid polyethylene oxide for the regulation of the viscosity. Solid carrier materials which can be used include, for example, starch, lactose, mannitol, methyl-cellulose, talc, highly dispersed silicic acid, high molecular weight fatty acids, such as stearic acid, gelatine, agar-agar, calcium phosphate, magnesium stearate, animal and vegetable fats, solid high molecular weight polymers, such as polyethylene glycols; for oral administration, the compositions can, if desired, also contain flavoring and sweetening agents.

The following Examples are illustrative.

EXAMPLE 1

4-[β-Fluorenyl-(9)-acetamidoethyl]-N-[5-cyclo-hexyl-pyrimidinyl-(2)]-benzene-sulfonamide 2.46 Grams of fluorenyl-(9)-acetic acid and 4.6 milliliters of thionyl chloride are heated under reflux for 2 hours, excess thionyl chloride is distilled off in a vacuum and the remaining crude fluorenyl-(9)-acetyl chloride is taken up in 10 milliliters anhydrous methylene chloride. 3.6 Grams 4-(β-amino-ethyl)-N-[5-cyclohexyl-pyrimidinyl-(2)]-benzene-sulfonamide (melting point 272°–273° C.) are dissolved in 5 milliliters 2N sodium hydroxide solution and about 100 milliliters water and, while cooling with ice and stirring, mixed dropwise with the solution of fluorenyl-(9)-acetyl chloride in methylene chloride. By the gradual dropwise addition of further dilute sodium hydroxide solution, the solution is maintained at a pH of 12–13. The reaction mixture is then stirred for 1 hour, acidified with acetic acid and the methylene chloride distilled off. The precipitated substance is filtered off with suction, dissolved in a dilute solution of sodium hydroxide and, after treatment with activated charcoal, precipitated out again by passing carbon dioxide into the solution. The substance is again dissolved in a dilute solution of sodium hydroxide and then reprecipitated by the addition of hydrochloric acid. For further purification, the product, after drying, is recrystallized from a mixture of benzene and ethylene chloride. There are obtained 3.55 grams (63 percent of theory) 4-[β-fluorenyl-(9)-acetamido-ethyl]-N-[5-cyclohexyl-pyrimidinyl-(2)]-benzene-sulfonamide; melting point 123°–126° C.

The 4-(β-aminoethyl)-N-[5-cyclohexyl-pyrimidinyl-(2)]-benzene-sulfonamide used as starting material is obtained by the alkaline hydrolysis of 4-(β-ethoxycarbonyl-aminoethyl)-N-[5-cyclohexyl-pyrimidinyl-(2)]-benzene-sulfonamide (melting point 165°C.).

The following compounds are obtained in an analogous manner:

4-(β-fluorenyl-(9)-acetamidoethyl)-N-[5-propyl-pyrimidinyl-(2)]-benzene sulfonamide Melting point 126°–128° C., after recrystallization from benzene-ethylene chloride. (For the preparation, there is used 4-(β-aminoethyl)-N-[5-propyl-pyrimidinyl-(2)]-benzene-sulfonamide; melting point 227°–229° C.)

4-(β-fluorenyl-(9)-acetamidoethyl)-N-[5-isobutyl-pyrimidinyl-(2)]benzene-sulfonamide Melting point 155°–156° C., after recrystallization from toluene. (For the preparation, there is used 4-(β-aminoethyl-N-[5-isobutyl-pyrimidinyl-(2)]-benzene-sulfonamide; melting point 235°–237° C.)

4-(β-fluorenyl-(9)-acetamidoethyl)-N-[5-cyclohexylmethyl-pyrimidinyl-(2)]-benzene-sulfonamide Melting point 162° C., after recrystallization from isopropanol. (For the preparation, there is used 4-(β-amino-ethyl)-N-[5-cyclohexyl-methyl-pyrimidinyl-(2)]-benzene-sulfonamide; decomposition above 260° C.)

4-(β-fluorenyl-(9)-acetamidoethyl)-N-[5-ethoxy-pyrimidinyl-(2)]-benzene-sulfonamide Upon recrystallization from aqueous ethanol, the monohydrate precipitates out; melting point 140°–142° C. Above the melting point, the substance solidifies again and then melts once more at 196°–198° C. (For the preparation, there is used 4-(β-aminoethyl)-N-[5-ethoxy-pyrimidinyl-(2)]-benzene-sulfonamide; melting point 260°–262° C.)

4-(β-fluorenyl-(9)-acetamidoethyl)-N-[5-ethoxymethyl-pyrimidinyl-(2)]-benzene-sulfonamide Monohydrate melting point 114°–116° C., after recrystallization from ethanol. (For the preparation, there is used 4-(β-aminoethyl)-N-[5-ethoxymethyl-pyrimidinyl-(2)]-benzene-sulfonamide; melting point 224° C.)

4-(β-fluorenyl-(9)-acetamidoethyl)-N-[5-(β-methoxyethoxy)-pyrimidinyl-(2)]-benzene-sulfonamide Melting point 148°–150° C., after recrystallization from ethanol. (For the preparation, there is used 4-(β-aminoethyl)-N-[5-(β-methoxyethoxy)-pyrimidinyl-(2)]-benzene-sulfonamide; melting point 200°–202° C.)

4-(β-fluorenyl-(9)-acetamidoethyl)-N-[5-cyclohexyloxy-pyrimidinyl-(2)]-benzene-sulfonamide Melting point 132°–134° C., after recrystallization from ethanol. (For the preparation, there is used 4-(β-aminoethyl)-N-[5-cyclohexyloxy-pyrimidinyl-(2)]-benzene-sulfonamide; melting point 253°–254° C.)

4-(β-fluorenyl-(9)-acetamidoethyl)-N-[5-propylmercapto-pyrimidinyl-(2)]-benzene-sulfonamide Melting point 170°–173° C., after recrystallization from toluene. (For the preparation, there is used 4-(β-aminoethyl-N-[5-propylmercapto-pyrimidinyl-(2)]-benzene-sulfonamide; melting point 210°–212° C.)

4-(β-fluorenyl-(9)-acetamidoethyl)-N-[4-methyl-5-isopropyl-pyrimidinyl-(2)]-benzene-sulfonamide Melting point 123°–125° C., after recrystallization from ethylene chloride/carbon tetrachloride. (For the preparation, there is used 4-(β-aminoethyl)-N-[4-methyl-5-isopropyl-pyrimidinyl-(2)]-benzene-sulfonamide; melting point 225°–227° C.)

4-(β-fluorenyl-(9)-acetamidoethyl)-N-[5,6,7,8-tetrahydroquinazo-linyl-(2)]-benzene-sulfonamide Melting point 232°–235° C., after two reprecipitations. (For the preparation, there is used 4-(β-aminoethyl)-N-[5,6,7,8-tetrahydroquinazolinyl-(2)]-benzene-sulfonamide; melting point 210°–212° C.)

4-(β-fluorenyl-(9)-acetamidopropyl)-N-[5-propyl-pyrimidinyl-(2)]-benzene-sulfonamide Melting point 178°–180° C., after recrystallization from ethanol. (For the preparation, there is used 4-(β-aminopropyl)-N-[5-propyl-pyrimidinyl-(2)]-benzene-sulfonamide; melting point 228°–232° C.)

2-(fluorenyl-(9)-acetamido)-N-[5-isobutyl-pyrimidinyl-(2)]-indane-5-sulfonamide

After recrystallization from ethanol, the substance is again dissolved in a dilute solution of sodium hydroxide and precipitated with dilute hydrochloric acid. The substance contains ½ mole water of crystallization and has a melting point of 150°–153° C. (For the preparation, there is used 2-amino-N-[5-isobutyl-pyrimidinyl-(2)]-indane-5-sulphonamide; Melting point 235°–240° C.)

2-(β-fluorenyl-(9)-propionylamido)-N-[5-isobutyl-pyrimidinyl-(2)]-indane-5-sulfonamide Melting point 127°–132° C., after recrystallization from benzene/ligroin. (For the preparation, the acid chloride obtained from β-[fluorenyl-(9)]-propionic acid and thionyl chloride is reacted with 2-amino-N-[5-isobutyl-pyrimidinyl-(2)]-indane-5-sulfonamide.)

EXAMPLE 2

4-(β-fluorene-9-carboxamido-ethyl)-N-[5-isopropylmercapto-pyrimidinyl-(2)]-benzene-sulfonamide 2.4 Grams 4-(β-aminoethyl)-N-[5-isopropylmercapto-pyrimidinyl-(2)]-benzene-sulfonamide (melting point 223° C) are dissolved in 4 milliliters 2N sodium hydroxide solution and about 30 milliliters water and, while cooling with ice, a solution of 1.83 grams fluorene-9-carboxylic acid chloride in 10 milliliters methylene chloride is slowly added dropwise. By the gradual addition of further dilute sodium hydroxide solution, the pH of the solution is maintained at 12–13. The reaction mixture is further stirred for one hour, then acidified with acetic acid and the methylene chloride driven off by heating. The precipitated substance is filtered off with suction, dissolved in dilute sodium hydroxide solution and, after treatment of the solution with activated charcoal, precipitated out by passing in carbon dioxide and then again dissolved in sodium hydroxide solution and reprecipitated with hydrochloric acid. For further purification, the product, after drying, is first recrystallized from chloroform and thereafter from a mixture of ethylene chloride and ethanol. There is obtained 1.7 grams (46 percent of theory) 4-(β-fluorene-9-carboxamidoethyl)-N-[5-isopropylmercaptopyrimidinyl-(2)]-benzene-sulfonamide; melting point 223°–227° C.

The following compounds are obtained in an analogous manner:

4-(fluorene-9-carboxamidomethyl)-N-[5-isobutyl-pyrimidinyl-(2)]-benzene-sulfonamide Monohydrate melting point 147°–150° C., after recrystallization from ethanol. The 4-aminomethyl-N-[5-isobutyl-pyrimidinyl-(2)]-benzene-sulfonamide (melting point 233°–235° C.) used as starting material is obtained by the alkaline hydrolysis of 4-(ethoxycarbonyl-aminomethyl)-N-[5-isobutyl-pyrimidinyl-(2)]-benzene-sulfonamide (melting point 187°–189° C.)

4-(β-fluorene-9-carboxamidoethyl)-N-[5-isobutyl-pyrimidinyl-(2)]-benzene-sulfonamide Melting point 202°–203° C., after recrystallization from ethanol.

4-(β-fluorene-9-carboxamidoethyl)-N-[5-propoxy-pyrimidinyl-(2)]-benzene-sulfonamide Melting point (substance containing water of crystallization) 109°–112° C., after dissolving in a dilute solution of sodium hydroxide and reprecipitating with dilute hydrochloric acid. (For the preparation, there is used 4-(β-aminoethyl)-N-[5-propoxy-pyrimidinyl-(2)]-benzene-sulfonamide; melting point 206°C) 4-(β-fluorene-9-carboxamidoethyl)-N-[4-METHYL-5-isobutyl-pyrimidinyl-(2)]-benzene-sulfonamide Melting point 210°–213° C., after recrystallization from methanol and ethylene chloride. (For the preparation, there is used 4-(β-aminoethyl)-N-[4-methyl-5-isobutyl-pyrimidinyl-(2)]-benzene-sulfonamide; melting point 197°–199° C.)

4-(β-fluorene-9-carboxamidoethyl)-N-[6,7,8,9-tetrahydro-5H-cyclohepta[d]pyrimidinyl-(2)]-benzene-sulfonamide For purification, the compound is first recrystallized from ethanol and then from a mixture of carbon tetrachloride and ethylene chloride and thereafter dissolved in a dilute solution of sodium hydroxide and reprecipitated with dilute hydrochloric acid; melting point 216°–220° C. (For the preparation, there is used 4-(β-aminoethyl)-N-[6,7,8,9-tetrahydro-5H-cyclohepta[d]pyrimidinyl-(2)]-benzene-sulfonamide; melting point 237°–238° C.)

EXAMPLE 3

4-(β-fluorene-9-carboxamidoethyl)-N-[5-benzyl-pyrimidinyl-(2)]-benzene-sulfonamide 3.0 Grams fluorene-9-carboxylic acid chloride are added, with stirring and ice cooling, to 3.66 grams 4-(β-amino-ethyl)-N-[5-benzyl-pyrimidinyl-(2)]-benzene-sulfonamide hydrochloride (melting point 251°–253° C.) in 20 milliliters anhydrous pyridine. The reaction mixture is left to stand for 2 hours at ambient temperature and then heated on a steambath for 1 hour. After cooling, the reaction mixture is poured, with stirring, into 150 milliliters water, acidified with concentrated hydrochloric acid and the reaction product then filtered off with suction. For purification, the product is dissolved in 400 milliliters hot water, with the addition of 10 milliliters 2N sodium hydroxide solution, reprecipitated by passing in carbon dioxide, cooled and the product filtered off with suction, again dissolved in hot very dilute sodium hydroxide solution, the solution treated with activated charcoal and again precipitated by the addition of hydrochloric acid. For further purification, the product is again dissolved in water, with the addition of the equivalent amount of sodium hydroxide solution, by the addition of further sodium hydroxide a brown impurity is precipitated and the desired compound is obtained by acidification of the filtrate. Thereafter, it is again dissolved in dilute sodium hydroxide solution and reprecipitated with dilute hydrochloric acid. There is thus obtained 4-(β-fluorene-9-carboxamidoethyl)-N-[5-benzyl-pyrimidinyl-(2)]-benzene-sulfonamide with a melting point of 113°–115° C.

EXAMPLE 4

4-(β-fluorenyl-(9)-acetamidoethyl)-N-[5-isobutyl-pyrimidinyl-(2)]-benzene-sulfonamide 1.4 Grams 4-[β-fluorenylidene-(9)-acetamidoethyl]-N-[5-isobutyl-pyrimidinyl-(2)]-benzene-sulfonamide (melting point 220°–221° C.) are dissolved in 120 milliliters methanol, with the addition of 2 milliliters 2N sodium hydroxide solution and hydrogenated at ambient temperature and atmospheric pressure in the presence of a palladium-charcoal catalyst. Thereafter, the catalyst is filtered off with suction, the filtrate is evaporated, the residue is taken up in water and, after again filtering, the filtrate is acidified with dilute hydrochloric acid. The substance which thereby precipitates is filtered off with suction, dried and recrystallized from toluene. There is obtained 1.3 grams (93 percent of theory) 4-[β-fluorenyl-(9)-acetamidoethyl]-N-[5-isobutyl pyrimidinyl-(2)]-benzene-sulfonamide, which has a melting point of 156°–157° C.

The 4-[β-fluorenylidene-(9)-acetamidoethyl]-N-[5-isobutyl-pyrimidinyl-(2)]-benzene-sulfonamide used as starting material is obtained by the reaction of fluorenylidene-(9)-acetyl chloride with 4-(β-aminoethyl)-N-[5-isobutyl-pyrimidinyl-(2)]-benzene-sulfonamide.

EXAMPLE 5

4-[β-fluorenyl-(9)-acetamidoethyl]-N-[5-isobutyl-pyrimidinyl-(2)]-benzene-sulfonamide From 4-[β-fluorenyl-(9)-acetamidoethyl]-benzene-sulfonamide (melting point 207°–209° C.), there is first prepared the sodium salt. 4.3 Grams of this sodium salt and 2.3 grams 2-trimethyl-ammonium 5-isobutyl-pyrimidine chloride (melting point 165° C., with decomposition; prepared from 2-chloro-5-isobutyl-pyrimidine and trimethylamine in benzene) are stirred for 16 hours at ambient temperature in 15 milliliters, N,N-dimethyl acetamide. Thereafter, the solution is diluted with water to 100 milliliters. Some unreacted 4-[β-fluorenyl-(9)-acetamido-ethyl]-benzene-sulfonamide precipitates out and is recovered by suction filtration. The filtrate is acidified with dilute hydrochloric acid, which results in the precipitation of 4-[β-'fluorenyl-(9)-acetamidoethyl]-N-[5-isobutyl-pyrimidinyl-(2)]-benzene-sulfonamide. After filtering off and drying, it is recrystallized from toluene and has a melting point of 155°–156° C.

EXAMPLE 6

4-[β-fluorenyl-(9)-acetamidoethyl]-N-[5-phenyl-pyrimidinyl-(2)]-benzene-sulfonamide 4.3 Grams of the sodium salt of 4-[β-fluorenyl-(9)-acetamidoethyl]-benzenesulfonamide (see Example 5) and 1.9 grams 2-chloro-5-phenyl-pyrimidine (melting point 127°–130° C.; prepared from 2-hydroxy-5-phenyl-pyrimidine and phosphorus oxychloride) are thoroughly ground together and then heated on an oil bath for 6 hours at 140° C. After cooling, the reaction mixture is digested with ether to remove unreacted 2-chloro-5-phenyl-pyrimidine then the precipitate is repeatedly reprecipitated by dissolving in very dilute sodium carbonate solution, treating the solution with activated charcoal and precipitating with dilute hydrochloric acid. After recrystallizing the product from isopropanol, there is obtained 4-[β-fluorenyl-(9)-acetamidoethyl]-N-[5-phenyl-pyrimidinyl-(2)]-benzene-sulfonamide which melts at 122°–125° C.

The blood sugar reducing activity of test compounds representative of this invention was measured in the rabbit following i.v. administration of the test compounds. In each instance, the threshold dosage, i.e. the lowest dosage of compound required to produce a significant reduction in the blood sugar level, was determined. The values reported in Table I, below, are relative values, based on the standard substance $N_1$-(sulfanilyl)-$N_2$-(n-butyl)urea which has a value of 1. The threshold dosage of this standard substance was 200 mg/kg in this test series.

For purposes of comparison, 2-benzene sulfonamido-5-methoxyethoxypyrimidine, was also tested under the same conditions.

The results are set forth in Table I, below.

TABLE I

| Compound | Chemical name | Relative blood sugar reducing activity |
|---|---|---|
| A | 4-[β-fluorenyl-(9)-acetamido-ethyl]-N-[5-ethoxymethyl-pyrimidinyl-(2)]-benzene-sulfonamide. | 16,000 |
| B | 4-[β-fluorenyl-(9)-acetamido-ethyl]-N-[5-cyclohexyl-pyrimidinyl-(2)]-benzene-sulfonamide. | 8,000 |
| C | 4-[β-fluorenyl-(9)-acetamido-ethyl]-N-[5-propyl-pyrimidinyl-(2)]-benzene-sulfonamide. | 8,000 |
| D | 4-[β-fluorenyl-(9)-acetamido-ethyl]-N-[4-methyl-5-isopropylpyrimidinyl-(2)]-benzene-sulfonamide. | 8,000 |
| E | 4-[β-fluorenyl-(9)-acetamido-ethyl]-N-[5-isobutyl-pyrimidinyl-(2)]-benzene-sulfanomide. | 4,000 |
| F | 4-[β-fluorenyl-(9)-acetamido-ethyl]-N-[5-ethoxy-pyrimidinyl-(2)]-benzene-sulfonamide. | 4,000 |
| G | 4-[β-fluorenyl-(9)-acetamido-ethyl]-N-[5,6,7,8-tetrahydroquinazolinyl-(2)]-benzene-sulfonamide. | 4,000 |
| H | 2-[fluorenyl-(9)-acetamido]-N-[5-isobutyl-pyrimidinyl-(2)]-indan-5-sulfonamide. | 4,000 |
| I | 4-[β-fluoren-9-carbonamido-ethyl]-N-[5-isobutyl-pyrimidinyl-(2)]-benzene-sulfonamide. | 4,000 |
| J | 4-[β-fluorenyl-(9)-acetamido-ethyl]-N-[5-(β-methoxyethoxy)-pyrimidinyl-(2)]-benzene-sulfonamide. | 2,000 |
| K | 4-[β-fluorenyl-(9)-acetamido-ethyl]-N-[5-propylmercaptopyrimidinyl-(2)]-benzene-sulfonamide. | 2,000 |
| L | 4-[β-fluorenyl-(9)-acetamido-propyl]-N-[5-propyl-pyrimidinyl-(2)]-benzene-sulfonamide. | 2,000 |
| M | 4-[β-fluoren-9-carboxamido-ethyl]-N-[5-propoxy-pyrimidinyl-(2)]-benzene-sulfonamide. | 2,000 |
| | $N_1$-(sulfanilyl))-$N_2$-(n-butyl)-urea | 1 |
| | 2-benzene-sulfonamido-5-methoxyethoxy pyrimidine. | 10 |

It is evident from the test results set forth in Table I that the compounds of this invention are more effective, by several orders of magnitude, than 2-benzene-sulfonamido-5-methoxyethoxy pyrimidine and $N_1$-(sulfanilyl)-$N_2$-(n-butyl)urea. The threshold dosage of the instant compounds ranges from 0.0125 to 0.1 mg/kg, compared to 200 mg/kg for $N_1$-(sulfanilyl)-$N_2$-(n-butyl)urea.

The dosage of the novel compounds of the present invention for the treatment of diabetes depends in the main on the age, weight, and condition of the patient being treated. The preferable form of administration is via the oral route in connection with which dosage units containing 5–500 mg. of active compound in combination with a suitable pharmaceutical diluent is employed. One or two unit dosages are good from one to four times a day.

What is claimed is:

1. A sulfonylaminopyrimidine of the formula:

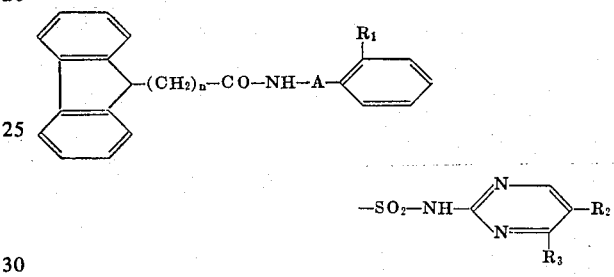

wherein A is straight or branched chain lower alkylene from one to three carbon atoms; $R_1$ is hydrogen or, together with A, represents trimethylene; $R_2$ is alkyl containing up to four carbon atoms, cycloalkyl containing up to six carbon atoms, cycloalkylalkyl containing up to seven carbon atoms, phenyl, benzyl, alkoxy containing up to three carbon atoms, cycloalkoxy containing up to six carbon atoms, alkoxyalkyl containing up to three carbon atoms, alkoxy-alkoxy of up to three carbon atoms, or alkylmercapto of up to three carbon atoms; $R_3$ is hydrogen or lower alkyl; and $R_2$ and $R_3$ taken together represents a chain of three to five methylene radicals to form, together with the carbon atoms to which they are attached, a hydrocarbyl ring structure; and $n$ is 0, 1 or 2; and physiologically compatible salts thereof.

2. A sulfonylaminopyrimidine as claimed in claim 1 wherein the lower alkylene A contains at least two carbon atoms and the acylamido function

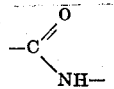

is attached to the beta carbon atom of the lower alkylene A.

3. A compound as claimed in claim 1 wherein the compound is 4-(β-fluorenyl-(9)-acetamido-ethyl)-N-[5-ethoxy-methyl-pyrimidinyl-(2)]-benzene-sulfonamide.

4. A compound as claimed in claim 1 wherein the compound is 4-(β-fluorenyl-(9)-acetamido-ethyl)-N-[5-cyclohexyl-pyrimidinyl-(2)]-benzene-sulfonamide.

5. A compound as claimed in claim 1 wherein the compound is 4-(β-fluorenyl-(9)-acetamido-ethyl)-N-[5-propyl-pyrimidinyl-(2)]-benzene-sulfonamide.

6. A compound as claimed in claim 1 wherein the compound is 4-(β-fluorenyl-(9)-acetamido-ethyl)-N-

[4-methyl-5-isopropyl-pyrimidinyl-(2)]-benzene-sulfonamide.

7. A compound as claimed in claim 1 wherein the compound is 4-(β-fluorenyl-(9)-acetamido-ethyl)-N-[5,6,7,8-tetrahydroquinazolinyl-(2)]-benzene-sulfonamide.

8. A compound as claimed in claim 1 wherein the compound is 2-[fluorenyl-(9)-acetamido]-N-[5-isobutyl-pyrimidinyl-(2)]-indan-5-sulfonamide.

9. A compound as claimed in claim 1 wherein the compound is 4-(β-fluoren-9-carboxamido-ethyl)-N-[5-isobutyl-pyrimidinyl-(2)]-benzene-sulfonamide.

10. Method of effecting antidiabetic therapy for a mammal comprising administering to said mammal an antidiabetic composition comprising, as an active ingredient, a compound as claimed in claim 1 and a diluent amount of a pharmaceutically acceptable carrier.

* * * * *